United States Patent Office.

JAMES L. ROWLAND, OF MILWAUKEE, WISCONSIN.

Letters Patent No. 109,669, dated November 29, 1870.

IMPROVEMENT IN THE MANUFACTURE OF ARTIFICIAL STONE.

The Schedule referred to in these Letters Patent and making part of the same.

I, JAMES L. ROWLAND, of Milwaukee, in the county of Milwaukee, and State of Wisconsin, have invented certain Improvements in the Manufacture of Artificial Stone, of which the following is a specification.

Nature and Objects of the Invention.

First, I procure some of one or more of the various kinds of sands, rocks, scoria, or other hard materials, being governed somewhat in this selection by the particular properties or qualities desired in the manufactured article, and crush the same to a degree of fineness dependent likewise on their properties and qualities.

For instance, if a stone for a specific purpose be required, as one with a sharp grit for grinding, cutting, or polishing hard substances, materials should be selected in view of its fitness or adaptation to this purpose, and if the stone is to receive fine or delicate impressions, to present a sharp outline, or a very smooth surface, the materials employed, or a portion of them, at least, should be finely crushed or pulverized.

The breaking down, crushing, and pulverizing of the materials above described result in a variety of sharp, angular forms, with rough, coherent, and clean surfaces, which particles, when combined with substances or materials hereinafter described, can not only be forced or compressed into a mechanical arrangement of greater strength and permanency than material which is found in a fine natural state with the particles or atoms dulled and rounded by attrition, but also more firmly held and retained in the places and positions in which they shall be forced or arranged by compression.

Next, I either prepare material for a bond or combining medium, and also for conversion or transmutation into stone, as hereinafter described, when desired, by first finely crushing or pulverizing with a system of rollers, or other suitable machinery, a good quicklime, and then, slaking it with the smallest quantity of water, in the form of steam or vapor, necessary to bring it to a dry and dusty or pulverulent powder, and passing it through bolting cloth of an exceedingly fine texture, to exclude any partially-slaked or unslaked and gritty parts or all that is not in a perfectly powdered condition; or, I manufacture it by breaking down into small fragments some of the calcareous, calcareo-magnesian, or calcareo-silicious and magnesian, or calcareo-silicious rocks or stones, and expelling their carbonic acid and water, and then reducing the same to an exceedingly fine and dusty powder, and passing it through bolts of very fine texture, as before described.

By this mode of treating rock or stone of the character described, and also the hydraulic limes or common or air lime, I obtain, in the state or condition of exceedingly-finely attenuated particles or atoms, a highly cementitious and re-convertible material or matter, which, when used in combination with other suitable materials, as herein described, becomes, through the chemical changes and transformations, effected by agencies herein described, an indestructable bond or combining medium of the highest attainable efficiency, or which, when unmixed or uncombined with sand or other hard materials, and managed and treated as hereinafter described, may be hardened and solidified or re-converted into stone, in its composition and nature very like, or the same as, but in many cases possessing qualities very superior to the originals from which this material shall have been reduced.

I also, when certain colors are permitted or desired, employ, in a finely pulverized or dissolved state, some of one or more of the native earths or metallic oxides, according to the color desired, I then thoroughly and intimately mix or combine these materials with one another.

The crushed or pulverized material first herein described with those which are intended to serve as the bond or combining medium, in the proportions of from one to one to twenty to one parts, inclusive in bulk, five, seven, eight, twelve, or fourteen parts of the former to one of the latter, being proportions suitable for many kinds of stone, sometimes using the prepared hydrate of quicklime and hydraulic cement in combination, as equal quantities in bulk of each, or two parts of one to one of the other, or other proportions, and as one element or cement, or first intimately mixing this prepared hydrate with the other materials and then adding the hydraulic cement and thoroughly intermixing; or, for the production of stone of the character hereinbefore described, by a transmutation or re-conversion of material, where the re-convertable materials described, or a hydraulic cement of commerce, improved by first having been pulverized to the greatest practicable degree of fineness and then passed through bolts of exceedingly fine, texture, to exclude those parts which are not in a finely powdered state, are employed, and uncombined with sand or other equivalent material. I mix these when a combination of them is desired, intimately, with one another, in various proportions, as, equal parts of each, or two parts of one to one of another, or other proportions.

I now, when all the materials intended to be employed have been thus combined and intermixed in their proper proportions, moisten this mixture, or, in the case of a conversion, the material employed, whether one or a mixture of two or more of the convertible materials, by sprinkling, through a suitable perforated vessel, or otherwise, water, or solutions of one or more of the mineral salts, as sulphate of alumina or alum, soda, potash, or their carbonates, or the silicates, between whose elements and those of the hydraulic limes, or cements, or other substances employed, there may be effected a chemical union, taking proper care that this moistening be done evenly, and to the degree fittest for reducing the mixture or material to the best condition and consistence to tamped, packed, or compressed into molds with greater compactness, receive and retain impressions, or otherwise manage in the formation of compact masses or articles; or, instead of moistening and intermixing, as in the above-described mode, the material which is intended to serve as the combining medium or bond, may, with water, or other solution, first be brought to the consistence of a thin paste and then proper proportions of the other materials intermixed thoroughly and intimately with it, by any efficient process till the mass has the consistence and condition above described.

The material or mixture thus treated is now placed in molds and compressed, or compressed or packed by firm and efficient tamping, into molds having the desired form or shapes and letters and other impressions put on it, if desired. External pressure is applied when practicable, as the most satisfactory results are obtained with the greatest practicable pressure. Then, when freed of its molds, the blocks or other articles are hardened by the absorption of carbonic acid and moisture from the air till fit for use; or, if speedy results and very great hardness is desired, the blocks or other articles, as delivered or taken from the molds, or at any time thereafter, are placed in kilns, tanks, chambers, or apartments of suitable constructions, which are then charged with carbonic-acid gas or carbonic acid and water, or carbonic acid and steam or vapors, or water saturated with this gas, and from time to time, as the affinities or wants of the material demand re-charging, and, if very quick results are desired, so regulated as to temperature and moisture as to best insure the most efficient action of the gas in the process of hardening and maturing the material. In this condition the blocks or other articles are kept from one to three, to five, or eight days, or longer if necessary, the time depending on their composition, quality, and dimensions; or, they may first be arranged in tiers or other convenient positions, and a suitable covering of cloth or paper, that is, impervious to the gas, or any suitable holding mediums be then placed in a proper manner over and around them, in this manner forming the apartment.

The process of charging the kilns or apartments with carbonic acid, or water saturated with carbonic acid, or with this gas and steam or vapors or water, in combination, or of applying these to any material intended to be effected by them, may be done in various ways, under pressure, if desired.

A very simple and efficient mode, and one that I am now using, is the following:

I manufacture this gas, and also steam or vapors, in the same operation, by burning highly-carbonized substances—as charcoal, coke, or anthracite coal, or these in combination with one another or other mineral substances, as marble or limestone broken into fragments—in a suitable furnace, placed either within or outside, and contiguous to the kilns or apartments, and provided with arrangements permitting of the free escape or transmission of the gas directly into the apartments, and the steam or vapors in quantities as may be deemed desirable, the steam being obtained by placing over and near the burning material a pan made of thin sheet or boiler-iron, and of such dimensions as to nearly or quite cover the entire surface of the burning material, in which is kept a proper supply of water for conversion into steam.

The gas and steam or vapors may be conducted and discharged into the upper or other parts of the apartments, if deemed desirable, and water, when used, be discharged through a hose with its nozzle perforated with many small holes, and thus be distributed to the material in the different parts of the kilns or apartments.

The stone, blocks, or other articles, when formed in large masses, may be hardened and solidified on the spot where molded or shaped. So, also, fixtures, as floors, pavements, or the beds or foundations of these, when put down in a continuous stratum or layer, and of proper material, by covering the same in a suitable manner with any proper holding material or medium, and then proceeding and managing as described in the case of the apartments, or in any other suitable manner. So, also, continuous tubes, pipes, and sewers, whose composition is such as that there may be an efficiency in carbonic acid, or carbonic acid and moisture, in maturing and hardening them, may be considered as apartments, and be hardened by applying the gas, or the gas in combination with steam, vapor, or water, to their internal surfaces; and walls constructed hollow or with flues, and made of concrete, beton, or other like combination of material, may be hardened by using the hollows or flues as apartments, and charging those with the gas.

Whatever the arrangements adopted in these processes, they should be such as to insure a free admission or transmission of the gas, and also the steam or vapors or water, when used in combination with the gas, to the stone or other articles or material intended to be affected, and their confinement to the material to which applied.

By the use of carbonic acid in the manner described, or in any other suitable or equivalent manner, both a speedy and effectual means is secured for hardening and solidifying, or carbonating, or re-converting the hydraulic limes or cements, or cementitious and reconvertible materials manufactured or prepared as described, when treated and managed as herein described, or in any other suitable or equivalent manner; and also for hardening manufactured stone and other articles and mixtures, or combination of different materials, when wrought, molded, or compressed into various forms and shapes, or as applied to various uses, having as an ingredient or part or parts of their composition either hydraulic or quick-lime, or their hydrates, or hydraulic cement, or two or more of these in combination with one another, or in combination with such other substances as may form with these through the agencies of carbonic acid and water chemical unions, or whose compositions, bases, or combining medium are such as that there may be an affinity and need or efficiency in this gas to effect a union and consolidation of parts; the object and advantage of this being that stone or other articles or materials, instead of being limited, as in other cases, for their supplies of this gas, to the small quantities contained in the surrounding atmosphere, are furnished copiously, and not only in a manner and under such circumstances and conditions as they may with the greatest facility take to themselves for immediate use and appropriation the proportions and quantities of this element equal to their affinities and wants, but also under such as most facilitate the chemical changes and transformations in their composition requisite for speedy induration and solidification.

I also produce a strong, hard, durable, and cheap stone by mixing, in the proportions and manner afore described, the clean washed sands, in their natural state, with the cementitious materials manufactured as described, or the prepared hydrate of quick-lime described, combined or not with a hydraulic lime or hydraulic cement, or the native earths or metallic oxides, and then treating and managing this intermixture as those afore described.

Also a very cheap and strong concrete stone, by adding to a mixture the same, and prepared as for the cheap stone next above described, suitable proportions of coarse, clean gravel, pebbles, or natural stone broken into fragments, and then thoroughly intermixing all this material, and proceeding as afore-described.

The importance and advantage of securing in a mixture or material the consistence herein described, to wit, that which permits it to be packed or compressed into molds with greatest compactness, and of reducing, as described, the cementitious elements to the state of finely-attenuated particles or atoms, is quite obvious, since, in the production of strong and compact stone, there should be a proper admixture and adaption and the closest possible connection and contact of parts, and also an adaption in state or condition of the cementitious elements themselves to the chemical action upon which they are dependent for their efficiency as a bond or combining medium, this being as the fineness of their particles or atoms.

There is also effected, by this mode of preparing the cementitious materials, a great saving, since very much less quantities need be used and greater efficiency secured than by the use of much larger quanties of the same in a coarser state.

If desired, the artificial hydraulic cements or limes may be substituted for, take the place of, and be used in the same or like proportions and in like manner, for the purpose herein afore-described, as the natural, or they may be used in combination with the latter, in various proportions, with efficient results.

The induration or concretion of the hydraulic limes, or cements of commerce, or common or air lime, when slacked to a powder, as in the usual way, may be effected by proceeding with them in the manner as described for the hardening or conversion of the reconvertible materials into stone, but not with the same efficiency, and with greatly less satisfactory results.

A hydraulic cement of commerce may also be prepared for conversion into stone by grinding it, with a relatively small quantity of water or other solution, to a state of exceedingly-finely powdered particles or atoms.

Claims.

What I claim as my invention is—

1. An artificial stone manufactured from quick-lime slaked with the smallest quantity of water introduced in the shape of steam or vapor, in combination with other materials, substantially as described.

2. An artificial stone manufactured from a hydrate of lime, or hydraulic lime, or a hydraulic cement, treated as described, and combined or not, substantially as described.

3. The mode of hardening artificial stone and other articles, materials, mixtures, or combination of materials, by the introduction of carbonic-acid gas, artificially produced, into a structure of a holding medium placed or built over or around the same, substantially as herein described.

4. The mode of hardening artificial stone in the shape of tubes, pipes, or such articles, by the introduction into them of carbonic-acid gas, artificially produced, and holding it confined in such tubes, pipes, or other articles, substantially as described.

5. The mode of hardening walls, hollow or with flues made of artificial stone, by the introduction of carbonic acid, artificially produced, in the manner described.

6. The mode of hardening quick-lime, or hydrate of lime, or hydraulic lime, or hydraulic cement, by the use of carbonic acid artificially produced, substantially as described.

7. The hardening or maturing manufactured stone and other articles having for their base, or as a part or ingredient of their base or combining medium, hydraulic cement, by the use of carbonic acid artificially produced, substantially as described.

JAS. L. ROWLAND.

Witnesses:
 J. B. SMITH,
 WILLIAM M. HORNOR.